US005839817A

United States Patent [19]

Wei

[11] Patent Number: 5,839,817

[45] Date of Patent: Nov. 24, 1998

[54] DYNAMO-POWERED TORCH

[76] Inventor: Ming-Chih Wei, No. 1-16, Pang Po, 13 Lin, Le Shan Tsun, Kuei Shan Hsing, Taipei Hsien, Taiwan

[21] Appl. No.: 935,413

[22] Filed: Sep. 23, 1997

[51] Int. Cl.$^{6}$ ........................................................ B60Q 1/00

[52] U.S. Cl. .............................. 362/192; 362/183; 320/2; 320/61

[58] Field of Search ..................................... 362/192, 193, 362/183, 157; 320/2, 7, 35, 30; 322/38

[56] References Cited

U.S. PATENT DOCUMENTS

| | | | |
|---|---|---|---|
| 1,450,500 | 4/1923 | Harvey | 362/192 |
| 1,917,486 | 7/1933 | Beck | 362/192 |
| 2,490,309 | 12/1949 | Lehman | 362/192 |
| 3,099,402 | 7/1963 | Speck | 362/192 |

*Primary Examiner*—James C. Yeung
*Attorney, Agent, or Firm*—Heller Ehrman White & McAuliffe

[57] ABSTRACT

A dynamo-powered torch operative without a power supply in the form of a battery is disclosed. The dynamo-powered torch includes a cylindrical hollow body and a dynamo housed in the cylindrical hollow body. The cylindrical hollow body has a knob disposed at a rear end thereof. The knob has an axle centrally mounted on a face of the knob and a spiral power spring mounted around the axle. A clamp is mounted on the axle of the knob and driven by the spiral power spring. A gear train, which includes a first gear, a second gear, a drive shaft, a third gear and a forth gear, is provided for driving the dynamo. Two conductor strips extends from the dynamo to a bulb which is lit by current passing from the dynamo to the bulb via the conductor strips.

2 Claims, 3 Drawing Sheets

DYNAMO-POWERED TORCH

BACKGROUND OF THE INVENTION

1. Field of the Invention

The present invention relates to an electric torch, and more particularly to a dynamo-powered torch which is operative without a power supply in the form of batteries.

2. Description of Related Art

Torches are widely used for illumination in our daily life. Conventional torches generally require a power supply in the form of battery to light a bulb thereof. This has a disadvantage that, when a user is in urgent need of use of the electric torch and by chance, the electric power generated by the batteries is depleted, the torch can not be used. Also, the use of battery may result in relatively high cost, since the battery is a consumable product. Furthermore, discarded batteries may cause pollution to environment.

The present invention provides a dynamo-powered torch to mitigate and/or obviate the aforementioned problems.

SUMMARY OF THE INVENTION

One object of the present invention is to provide a dynamo-powered torch which is operative without power supply in the form of batteries.

In accordance with one aspect of the present invention, a dynamo-powered torch includes a cylindrical hollow body and a dynamo housed in the hollow body. The cylindrical hollow body has a knob disposed at a rear end thereof. The knob has an axle centrally mounted on a face of the knob and a spiral power spring mounted around the axle. A clamp is mounted on the axle of the knob and driven by the spiral power spring. A gear train is provided for driving the dynamo. The gear train includes a first gear, a second gear, a drive shaft, a third gear and a forth gear. The first gear defines a circular recess therein, a periphery of the recess being configured as unidirectional ratchet to engage with the clamp. The second gear engages with the first gear and drives the third gear through the drive shaft. The fourth gear engages with the third gear. The dynamo-powered torch further includes two conductor strips extending from the dynamo to the bulb which is lit by current passing from the dynamo to the bulb via the conductor strips.

In accordance with another aspect of the present invention, the axle of the cylindrical hollow body defines a slit therein for receiving an end of the spiral power spring.

Other objects, advantages and novel features of the invention will become more apparent from the following detailed description when taken in conjunction with the accompanying drawings.

DETAILED DESCRIPTION OF PREFERRED EMBODIMENT

Figure 1:
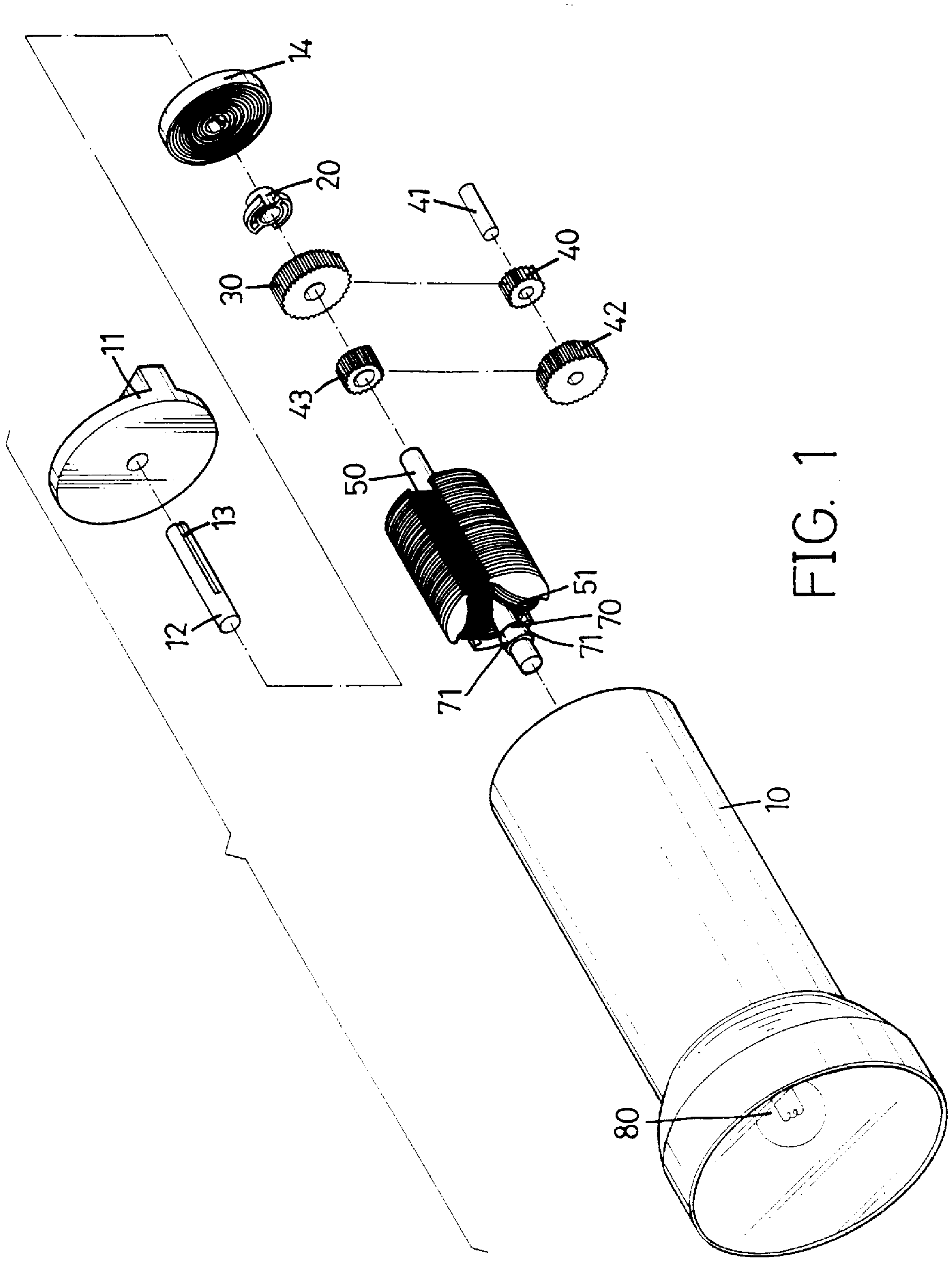
FIG. 1 is an exploded view showing the elements of a torch in accordance with the present invention.
Figure 3:
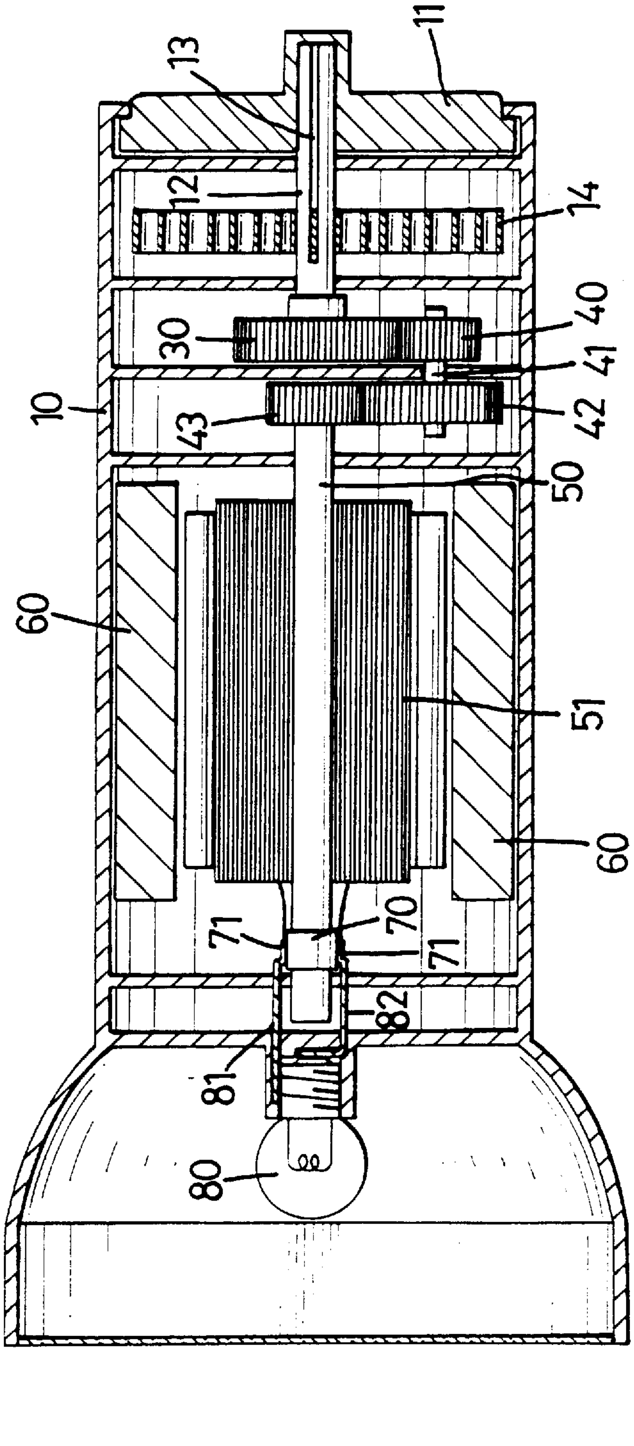
FIG. 3 is a cross-sectional view showing a combined structure of the torch in accordance with the present invention.

Referring to FIG. 1 and FIG. 3, a dynamo-powered torch in accordance with the present invention includes a cylindrical hollow body 10 and a dynamo 50 housed therein. The cylindrical hollow body 10 has a knob 11 disposed at a rear end thereof. The knob 11 has an axle 12 centrally mounted on a face thereof and a spiral power spring 14 mounted around the axle 12. The axle 12 can be driven by the knob 11 and a slit 13 is defined in the axle 12 for receiving an end of the spiral power spring 14.

A clamp 20 with a central hole (not numbered) is securely mounted on the axle 12 of the knob 11 and driven by the spiral power spring 14. The clamp 20 is substantially shaped as a "Z" (see FIG. 2) and engages with the spiral power spring 14 (see FIG. 3)

Figure 2:
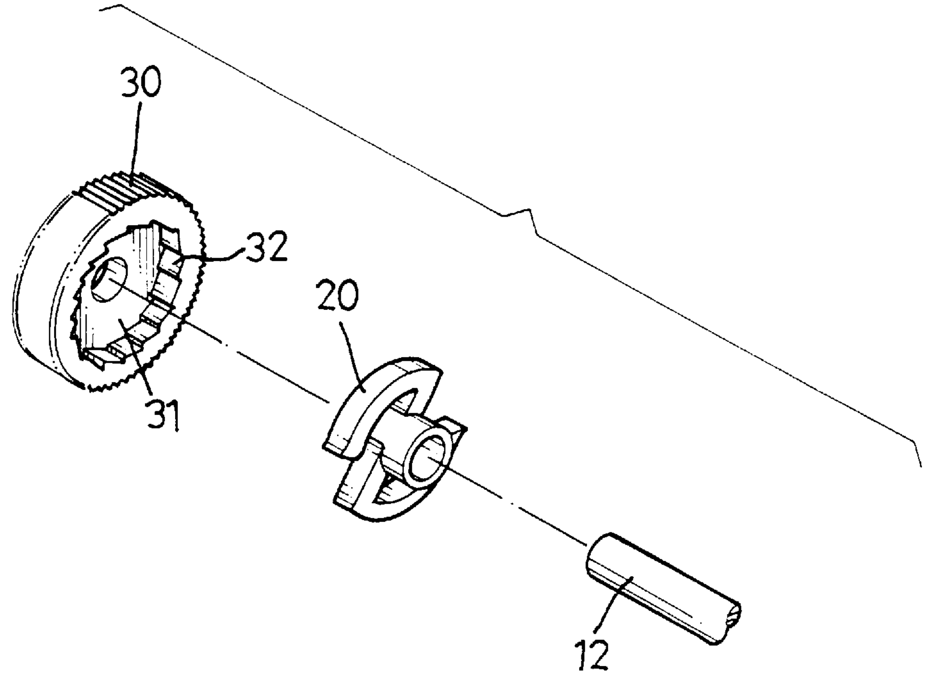
FIG. 2 is a partial exploded view of the torch in accordance with the present invention.

Referring to FIGS. 1 and 2, the dynamo-powered torch further includes a gear train (not numbered) driven by the clamp 20. The gear train is composed of a first gear 30, a second gear 40, a drive shaft 41, a third gear 42 and a forth gear 43. The first gear 30 is securely mounted on the axle 12 of the knob 11 and defines a circular recess 31 therein, a periphery of which is configured as unidirectional ratchet 32 to engage with the Z-shaped clamp 20. The second gear 40 is engaged with an outer circumference of the first gear 30 and drives the third gear 42 through the drive shaft 41. The forth gear 43 engages with the third gear 42 and drives the dynamo 50, as shown in FIG. 3, wherein, the drive shaft 41 has two distal ends which are rotatably received in the cylindrical hollow body 10.

The dynamo 50 is conventional and so not described in detail other than it includes an armature 52 with a plurality of coils 51 and a spindle 53, a plurality of magnets 60 and a commutator 70. The magnets 60 are disposed in the cylindrical hollow body 11 around the armature 52. The spindle 53 has a first end onto which the fourth gear 43 is securely mounted and a second end onto which the commutator 70 is fitted. Furthermore, the spindle 53 is rotatably extended through two locating arms 71 of the cylindrical hollow body 10. A pair of conductor strips 81,82 each have a first end diametrically in contact with the commutator 70 and a second end in contact with a bulb 80.

With the above mentioned arrangement, an electric torch operative without a power supply in the form of battery can be obtained. In operation, rotating the knob 11 at the rear end of the torch enables the spiral power spring 14 to be wound up. At this time, free rotation will be occur between the Z-shaped clamp 20 and the unidirectional ratchet 32 of the first gear 30. When the spiral power spring 14 is wound up to a maximum value, the knob 11 is released to enable the axle 12 to rotate reversely relative to the rotation of the knob 11, by virtue of elastic comeback of the spiral power spring 14, thereby making the Z-shaped clamp 20 engage with the unidirectional ratchet 32 and drive the first gear 30. As a result, the first gear 30, in turn, drives the second gear 40, the drive shaft 41, the third and the fourth gear 42, 43, and finally drives the dynamo 50 to rotate and generate electric power due to induction by the magnets 60. The resultant electric power is then transmitted to the conductor strips 81 and 82 for lighting the bulb 80. Accordingly, the dynamo-powered torch is preferably adapted for illumination when an emergency occurs, since the battery-free power supply for the bulb 80 thereof can be generated at any desired time.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dynamo-powered torch comprising:

a cylindrical hollow body having a front end and a rear end;

an axle rotatably supported within the body at the rear end thereof, the axle having a knob mounted at one end thereof so as to be rotatably disposed at the rear end of the body, a spiral power spring mounted around the axle, a substantially Z-shaped clamp securely mounted on the axle proximate the other end thereof so as to be driven by the spring, and a first gear mounted on the axle, the first gear having a circular recess defined within one face to receive the clamp, the periphery of the recess being configured as a unidirectional ratchet to engage the clamp;

a drive shaft rotatably supported within the body, the drive shaft having a second gear mounted at one end thereof, the second gear being circumferentially engaged with the first gear, and a third gear mounted at the other end thereof and driven by the drive shaft;

a dynamo having a spindle rotatably supported within the body, the spindle having a fourth gear mounted thereon, the fourth gear being circumferentially engaged by the third gear so that the dynamo is driven by the spring through the axle, the clamp, and the first through fourth gears;

a bulb mounted within the front end of the body; and two conductor strips electrically connecting the dynamo to the bulb.

2. A torch as claimed in claim 1, wherein the axle has a slit defined therein for receiving an end of the spiral power spring.

* * * * *